C. A. BEHLEN.
AXLE COUPLING FOR VEHICLES.
APPLICATION FILED OCT. 6, 1910.

1,010,217.

Patented Nov. 28, 1911.

Witnesses
Wm E Seaver
A. Cooper

Chas. A. Behlen.
Inventor

Paul Finckel
his Attorney

COLUMBIA PLANOGRAPH CO., WASHINGTON, D. C.

UNITED STATES PATENT OFFICE.

CHARLES A. BEHLEN, OF FRANKLIN, VIRGINIA.

AXLE-COUPLING FOR VEHICLES.

1,010,217. Specification of Letters Patent. Patented Nov. 28, 1911.

Application filed October 6, 1910. Serial No. 585,668.

*To all whom it may concern:*

Be it known that I, CHARLES A. BEHLEN, a citizen of the United States, residing at Franklin, in the county of Southampton and State of Virginia, have invented a certain new and useful Improvement in Axle-Couplings for Vehicles, of which the following is a specification.

The invention relates to an improved construction of front axle coupling in combination with the center spring of a spring gearing, as hereinafter more fully set forth.

Figure 1:
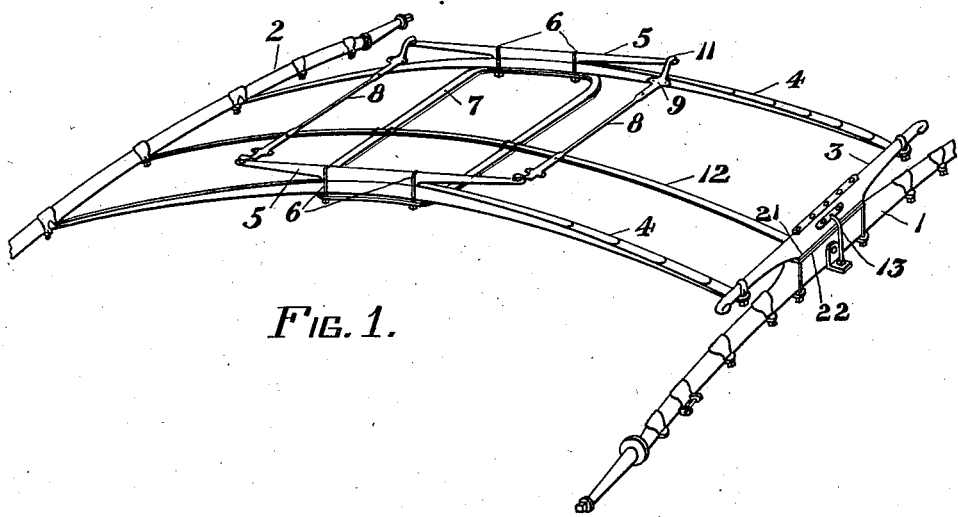
Figure 2:
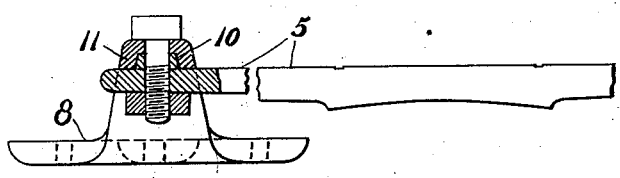
Figure 4:
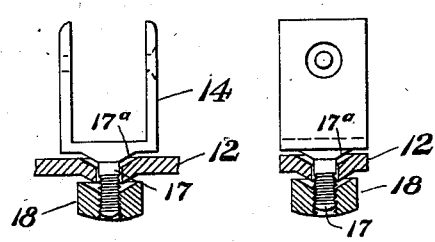
Figure 3:
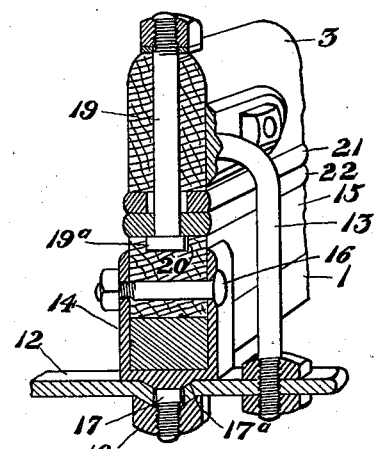

An embodiment of the invention is shown in the accompanying drawings forming a part of this specification, in which drawings, Figure 1 is a perspective view of the front and rear axles of a buggy with a spring gearing and axle coupling applied. Fig. 2 is a view of details of the connection between the metal side bars and the body loops or braces. Fig. 3 is a sectional view of the improved coupling for the front axle, and Fig. 4 is a detail view of parts of the improved axle coupling.

In the several views 1 and 2 designate the front and rear axles respectively.

3 designates the bolster, to which the side springs 4, 4 are connected by means of clips, as usual.

5, 5 designate rigid iron bars mounted longitudinally the main side springs 4, 4 and secured thereto by means of the clips 6. 7 designates a cross brace also secured to the side springs 4 by means of the clips 6.

The body of the vehicle, not shown, is supported on the body loops or braces 8, 8 which are provided with T portions 9 to strengthen the support and provide for the bolt connections. These body loops 8 are bolted to the iron side bars 5, and to strengthen the parts at the points of connection and to render such connections rigid, the parts about the bolt openings are reinforced by mating members comprising a lug or boss 10 on the side bar and a recessed part 11 on the body loop, into which recess said boss closely fits.

Intermediate the side springs 4, 4 is a center spring 12. This spring is clipped to the rear axle 2 and to the cross brace 7, and extends beneath and slightly beyond the front axle 1 where it is connected with the bolster 3 by means of the spring brace 13.

As shown in Fig. 3, the front axle 1 is coupled to and has pivotal connection with the center spring 12. The devices comprising this pivotal connection consist of a yoke 14 embracing and secured to the axle 1 and axle bed 15 by means of a bolt 16 passing through the axle bed. The yoke 14 is provided with a threaded yoke-bolt 17 and a rounded or cup shaped part 17$^a$. The yoke and yoke-bolt are preferably made of one solid piece of metal as shown in Fig. 3. The yoke-bolt 17 is passed through the center spring 12, the latter being saucered or concaved at the bolt opening to receive the cup shaped head of the yoke-bolt. The yoke is secured to the center spring by means of a nut 18 provided with a concaved face to fit the convexed portion of the center spring, as shown.

In the improved construction, as herein described, it will be seen that drilling of the axle for the passage of a king-bolt is avoided, and the cup and saucer bearing of the coupling distributes the strain at the pivotal point, while the concaved nut enables the wear to be readily and effectively taken up.

The pivotal connection between the axle 1 and bolster 3 comprises a king-bolt 19 passing through the bolster and provided with a square head 19$^a$ seated in a square mortise 20 in the axle bed to prevent the bolt from turning. Friction plates 21 and 22 are provided between the bolster and axle bed.

What I claim is:

In a vehicle of the class described, the combination with the axle and bolster, a pivotal member connecting the bolster with the upper portion of the axle, a center spring upon which the axle rests, and a pivotal connection between the axle and center spring comprising a yoke member embracing the axle and provided with a rounded bearing surface and a bolt integral with said yoke member projecting through the center spring, said spring provided with a depression to receive the rounded bearing of said yoke, and a nut for the bolt having a concaved face to engage the under surface of the depression in said spring.

CHARLES A. BEHLEN.

Witnesses:
LYDIA OWENS,
GEO. BROWNLEY.

Copies of this patent may be obtained for five cents each, by addressing the "Commissioner of Patents, Washington, D. C."